Patented Apr. 28, 1953

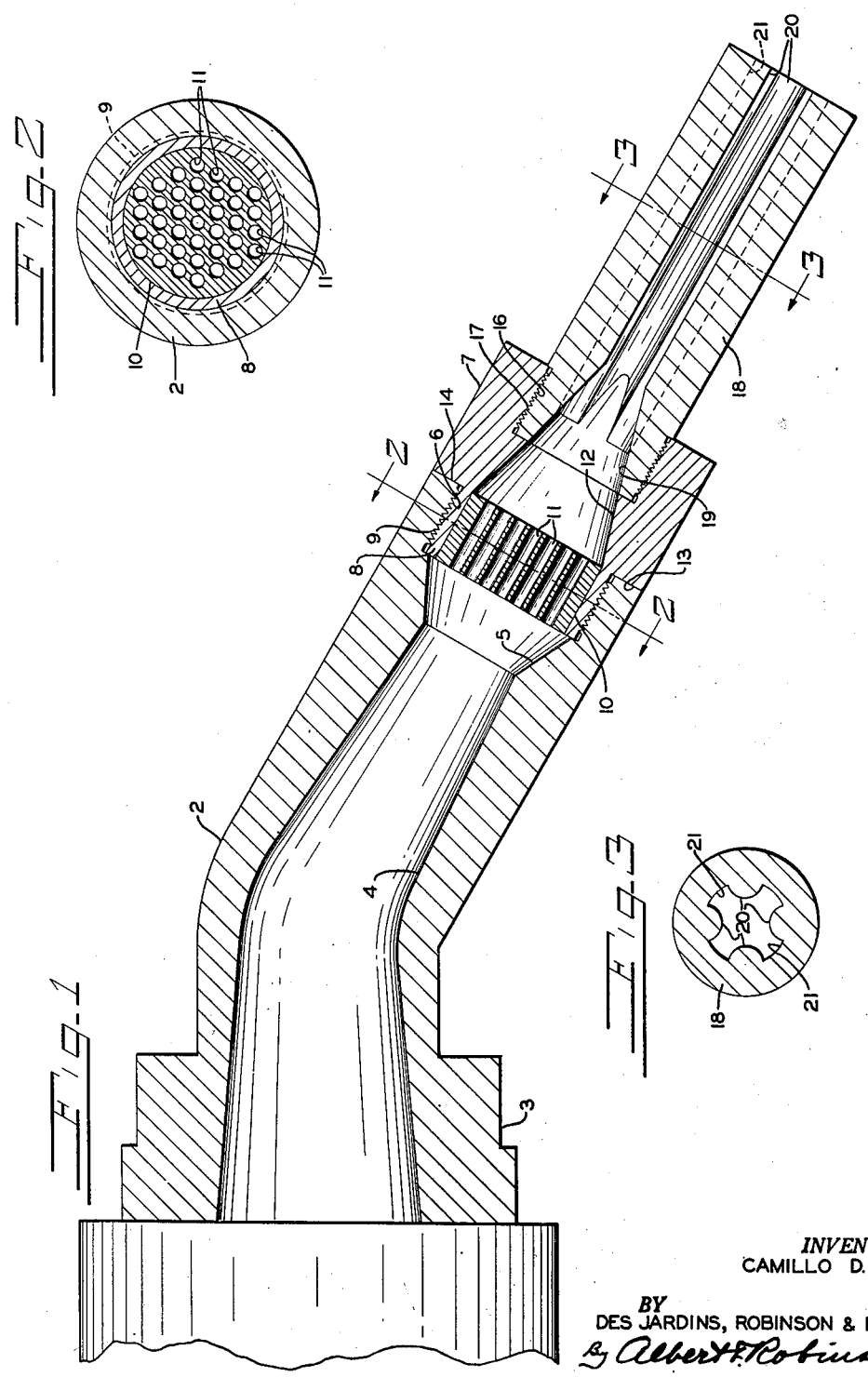

2,636,218

UNITED STATES PATENT OFFICE 2,636,218

EXTRUSION DIE UNIT FOR MOLDING PLASTIC MATERIALS

Camillo Dante Orsini, Highland Park, N. J., assignor to Nixon Nitration Works, Nixon, N. J., a corporation of New Jersey Application January 27, 1951, Serial No. 208,128

9 Claims. (Cl. 18—12)

1

This invention relates to an extrusion die unit for molding plastic materials, and it particularly pertains to a die unit including a filter and a nozzle having a passage therethrough of a form for more effectively cooling the extruded body and controlling its caliper.

The die unit is adapted for extruding thermoplastic and thermosetting plastics, and is especially suitable for extruding plastic material such as synthetic resins, like phenol-formaldehyde, cellulose acetate and the like.

One of the principal objects of my invention is to provide a die for forming an extruded body whose caliper is more effectively maintained.

Another object of the invention is in the provision of a die unit which speeds up the extrusion process.

Another object of the invention is in the provision of a die unit which provides for more effective cooling of the extruded body.

Further objects, and objects relating to details of construction and economies of operation, will readily appear from the detailed description to follow. In one instance I have accomplished the objects of my invention by the device and means set forth in the following specification. My invention is clearly defined and pointed out in the appended claims. A structure constituting a preferred embodiment of my invention is illustrated in the accompanying drawings forming a part of this specification, in which:

Fig. 1 is a vertical longitudinal cross section of the die unit embodying my invention attached to the discharged end of a conventional extruder.

Fig. 2 is a vertical cross section on line 2—2 of Fig. 1 through the filter.

Fig. 3 is a vertical cross sectional view on line 3—3 of Fig. 1 through the nozzle.

The invention generally described comprises a main adapter of substantial length having a longitudinal passage therethrough which is tapered from a larger to smaller cross section toward an oppositely tapered passage near the discharge end of the adapter. A sub-adapter or connector is fitted to the end of the main adapter to secure a perforated web or filter therebetween. The perforated web or filter is preferably integrally formed with the sub-adapter or connector.

This filter or web is formed in an extension of the sub-adapter or connector, and the sub-adapter is provided on its peripheral surface with means for engaging it with the interior wall of the main adapter. The bore in the sub-adapter, opposite to the filter or web, is tapered oppositely to the outwardly tapered portion of the main

2 adapter next to the opposite side of the filter. The connector or sub-adapter has a screw-threaded socket for receiving and holding a nozzle having a longitudinal passage whose inlet end is tapered in conformity with the tapered passage in the sub-adapter. The non-tapered wall portion of this passage in the nozzle is provided with longitudinal ribs, circumferentially spaced, to form longitudinal grooves in the periphery of the extruded body, thereby providing a larger peripheral area and with alternating surface portions which are nearer to the core of the body being extruded. Accordingly, the extruded body is more effectively cooled than if it were molded without the longitudinal grooves therein.

Referring specifically to the drawings in which like numerals designate like parts, numeral 2 is a main tubular adapter having an enlarged head 3 for being fitted to the end of a conventional extruder. Inasmuch as the extruded body is usually discharged upon a moving conveyor disposed at a lower elevation, the discharged end of this adapter is disposed at any desired angle to the inlet end.

A longitudinal passage 4 is formed in the main adapter, its wall being tapered from a larger to a smaller cross section from the inlet toward the outlet end where it communicates with an oppositely tapered wall passage 5. Beyond the oppositely tapered wall 5, there is a screw threaded portion 6 providing a socket for screw threadedly attaching a sub-adapter or connector 7 which has a reduced end 8 whose peripheral wall is screw threaded at 9. This reduced head is provided with a web end 10 having a series of small longitudinal passages 11 extending therethrough to communicate with the passage in the main adapter and a longitudinal passage 12 formed in the sub-adapter. The wall of this passage 12 is oppositely tapered to the tapered wall 5 at the outlet end of the main adapter. The shoulder 13, resulting from the reduced head of the sub-adapter, is abutted against the end 14 of the main adapter when the sub-adapter is screwed into the socket 6 of the main adapter.

A socket is provided in the sub-adapter having a screw-threaded wall 16 for receiving the screw-threaded end 17 of a nozzle 18 which is held thereon. The nozzle has a longitudinal passage therethrough with that portion of its wall 19 on the inlet side tapered to conform with the tapered wall of the passage in the sub-adapter. The main wall portion of the nozzle passage is of scalloped conformation to provide circumferentially spaced longitudinal ribs or projections 20 with resulting intervening depressions 21. This scalloped conformation of the wall of the passage of the nozzle provides a larger surface area and forms longitudinal grooves in the extruded body whose walls are nearer to the core of said extruded body than are the projections or portions between the grooves. Because of this greater surface area, the heat is more quickly dissipated from the extruded body, and, therefore, it can be more effectively cooled than if said extruded body were solid in cross section throughout its overall circumference.

I am aware that there may be various changes in details of construction without departing from the spirit of my invention and, therefore, I claim my invention broadly as indicated by the appended claims.

Having thus described my invention, what I claim as new and useful and desire to secure by United States Letters Patent, is:

1. An extrusion die unit comprising a main adapter for being fitted to the discharge end of an extruder, a sub-adapter nozzle holder screw threadedly fitted to the end of the main adapter by an annular projection or reduced diameter, a filter interposed, in unclamped condition, between the main adapter and the nozzle holder housed within the reduced annular projection of said holder, and a tubular nozzle fitted to the sub-adapter nozzle holder, said nozzle being provided with a longitudinal passage having longitudinal ribs circumferentially disposed on its passage wall.

2. An extrusion die unit as set forth in claim 1 in which the nozzle holder has a passage tapering from a larger to a smaller cross section away from the filter.

3. An extrusion die unit as set forth in claim 1 in which a cross section of the filter is greater than the passages leading to and from it.

4. An extrusion die unit as set forth in claim 3 in which the inlet passage toward the filter is tapered to greater cross section and the outlet passage is tapered away from said filter to smaller cross section.

5. An extrusion die unit as set forth in claim 4 in which the longitudinal ribs are disposed to form a passage having a scalloped wall.

6. An extrusion die unit comprising a sub-adapter provided with a transverse web, said web being housed within a connecting projection on said sub-adapter and having a plurality of small perforations therethrough to form a filter, and a tubular nozzle connected to said adapter, and out of contact with said transversed web, having a circumferentially scalloped wall surrounding the passage therethrough.

7. An extrusion die unit as set forth in claim 6 in which the web is formed on a projection on said adapter that serves as a means for assembling said adapter in the unit.

8. A sub-adapter for connecting a nozzle to a main adapter on an extruder having a projection on one end for connecting said sub-adapter to said main adapter, and a filter carried by the projection.

9. An extrusion die unit comprising a main adapter for being fitted to the discharge end of an extruder, a sub-adapter nozzle holder screw-threadedly fitted to the outlet end of the main adapter by a projection of reduced diameter on said sub-adapter nozzle holder fitting within a socket formed in the main adapter, a transverse filter web housed within the projection on said sub-adapter nozzle holder, and a nozzle fitted to said sub-adapter nozzle holder and out of contact with said transverse filter web.

CAMILLO DANTE ORSINI.

References Cited in the file of this patent

UNITED STATES PATENTS

| Number | Name | Date |
|--------|------|------|
| 523,584 | Mivelaz | July 24, 1894 |
| 1,738,665 | Ober | Dec. 19, 1929 |
| 2,291,212 | Clinefelter | July 28, 1942 |